United States Patent
Yamaguchi et al.

(10) Patent No.: US 6,801,286 B2
(45) Date of Patent: Oct. 5, 2004

(54) LIQUID CRYSTAL DISPLAY DEVICE HAVING PROTUBERANCE WITH BASE AREA ≦5% OF ONE PIXEL TO CONTROL LIQUID CRYSTAL MOLECULE ORIENTATION

(75) Inventors: Hidemasa Yamaguchi, Kanagawa (JP); Makoto Jisaki, Kanagawa (JP); Yoko Fukunaga, Kanagawa (JP); Shintarou Morita, Kanagawa (JP); Hiroaki Ichiawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 13 days.

(21) Appl. No.: 09/915,640

(22) Filed: Jul. 26, 2001

(65) Prior Publication Data

US 2002/0080312 A1 Jun. 27, 2002

(30) Foreign Application Priority Data

Jul. 27, 2000 (JP) .................................... P2000-227888

(51) Int. Cl.$^7$ ..................... G02F 1/1337; G02F 1/1335; G02F 1/1343
(52) U.S. Cl. ..................... 349/129; 349/123; 349/119; 349/143
(58) Field of Search .................. 349/123, 129, 349/117, 119, 143, 187

(56) References Cited

U.S. PATENT DOCUMENTS

| 6,188,457 | B1 | * | 2/2001 | Liu | 349/124 |
| 6,384,889 | B1 | * | 5/2002 | Miyachi et al. | 349/143 |
| 6,476,896 | B1 | * | 11/2002 | Liu | 349/129 |
| 2002/0001058 | A1 | * | 1/2002 | Wang | 349/129 |
| 2002/0063832 | A1 | * | 5/2002 | Wu et al. | 349/129 |
| 2002/0159012 | A1 | * | 10/2002 | Yamada | 349/122 |
| 2002/0180918 | A1 | * | 12/2002 | Yamada | 349/129 |

* cited by examiner

*Primary Examiner*—Tarifur R. Chowdhury
(74) *Attorney, Agent, or Firm*—Sonnenschein, Nath & Rosenthal LLP (57) ABSTRACT

A liquid crystal display device of a multi-domain vertical-alignment mode includes a driving substrate having a pixel electrode, a counter substrate opposing the driving substrate and having a counter electrode, and a liquid crystal sandwiched between the substrates. In the liquid crystal display device, molecules of the liquid crystal are aligned nearly perpendicularly to the substrates when no electric field is produced, and are aligned nearly horizontally by the application of a predetermined voltage. The counter substrate has an alignment center portion for orienting the molecules of the liquid crystal in all directions centered on a certain point when the voltage is applied. The area of the alignment center portion of the counter substrate is set to be less than or equal to 5% of the area of one pixel.

36 Claims, 4 Drawing Sheets

LIQUID CRYSTAL DISPLAY DEVICE HAVING PROTUBERANCE WITH BASE AREA ≦5% OF ONE PIXEL TO CONTROL LIQUID CRYSTAL MOLECULE ORIENTATION

RELATED APPLICATION DATA

The present application claims priority to Japanese Application No. P2000-227888 filed Jul. 27, 2000, which application is incorporated herein by reference to the extent permitted by law.

BACKGROUND OF THE INVENTION

The present invention relates to a multi-domain vertical-alignment liquid crystal display device which can ensure a wide viewing angle without decreasing the effective aperture ratio.

Presently available liquid crystal display devices generally use a TN (Twisted Nematic) mode as a liquid crystal display mode. In the TN mode, however, the viewing angle is narrow, and tone reversal occurs when the screen is viewed from an oblique direction, which seriously reduces the display quality. Moreover, the response speed is low in a halftone region and the outlines of video pictures are not clear. Such problems of the TN mode cannot be completely overcome even by phase compensation.

As the alternatives to the TN mode, various liquid crystal display modes, such as an IPS (In-Plane Switching) mode, an OCB (Optical Compensated Birefringence) mode, and a MVA (Multi-domain Vertical Alignment) mode, have recently been developed. Above all, the multi-domain vertical-alignment mode has received attention as a technique of increasing the viewing angle.

In the multi-domain vertical-alignment mode, a method using electric slits (SID 97 DIGEST p.461), a method using protuberances on the surface of a substrate (Japanese Patent No. 2947350), and the like have been proposed to carry out multi-domain alignment of the liquid crystal. Furthermore, in order to improve the transmittance of the liquid crystal display device of the multi-domain vertical-alignment mode and to overcome the problem of color shifting among the tones, methods for adding a chiral material and orienting the liquid crystal molecules in a twisted manner while a voltage is applied have been proposed (as disclosed in, for example, Japanese Unexamined Patent Application Publication No. 11-352490, Japanese Unexamined Patent Application (by PCT route) Publication No. 10-506479, SID 91 DIGEST pp. 762–765, 1991, and SID 92 DIGEST pp. 33–35, 1992).

In the liquid crystal display mode of the multi-domain vertical-alignment mode, however, the viewing angle cannot be increased satisfactorily, and the transmittance is sacrificed to increase the viewing angle. In particular, the protuberances and electrode slits formed on the surfaces of the substrates for the purpose of controlling the alignment do not serve as effective apertures, thus lowering the transmittance.

SUMMARY OF THE INVENTION

Accordingly, it is an object of the present invention to provide a liquid crystal display device of a multi-domain vertical-alignment mode which ensures a wide viewing angle without lowering the effective aperture ratio.

The present inventors found that it is effective, in achieving a wide viewing angle in a liquid crystal display device of a multi-domain vertical-alignment mode, to form a protuberance or an alignment disturbing surface serving as the alignment center on a counter substrate opposing pixel electrodes so that molecules of the liquid crystal are oriented in all directions around the alignment center when a voltage is applied. The present inventors also found that it is necessary, in order to prevent the effective aperture ratio from decreasing, to set the ratio of the area of the alignment center of the counter substrate (that is, the base area of a protuberance serving as the alignment center, or the surface area of an alignment disturbing surface serving as the alignment center) to the area of one pixel so as to be less than or equal to a predetermined ratio.

In order to achieve the above object, according to an aspect of the present invention, there is provided a liquid crystal display device of a multi-domain vertical-alignment mode including a driving substrate having a pixel electrode, a counter substrate opposing the driving substrate and having a counter electrode, and a liquid crystal sandwiched between the substrates, wherein molecules of the liquid crystal are aligned nearly perpendicularly to the substrates when no electric field is produced, and are aligned nearly horizontally by the application of a predetermined voltage, wherein the counter substrate has an alignment center portion for orienting the molecules of the liquid crystal in all directions centered on a certain point when the voltage is applied, and wherein the area of the alignment center portion of the counter substrate is set to be less than or equal to 5% of the area of one pixel.

According to another aspect of the present invention, there is provided a production method for a liquid crystal display device of a multi-domain vertical-alignment mode in which a driving substrate having a pixel electrode and a counter substrate having a counter electrode are opposed to each other, a liquid crystal is sandwiched between the substrates, and molecules of the liquid crystal are aligned nearly perpendicularly to the substrates when no electric field is produced, and are aligned nearly horizontally by the application of a predetermined voltage, wherein the counter substrate has an alignment center portion for orienting the molecules of the liquid crystal in all directions centered on a certain point when the voltage is applied, and wherein the area of the alignment center portion of the counter substrate is set to be less than or equal to 5% of the area of one pixel.

Further objects, features, and advantages of the present invention will become apparent from the following description of the preferred embodiments with reference to the attached drawings.

DESCRIPTION OF THE PREFERRED EMBODIMENTS

An active matrix liquid crystal display device according to an embodiment of the present invention will be described below in detail with reference to the attached drawings, whereas the present invention is also applicable to a passive matrix liquid crystal display device having pixel electrodes arranged in stripes. In the drawings, the same reference numerals denote the same or equivalent components.

Figure 1A:
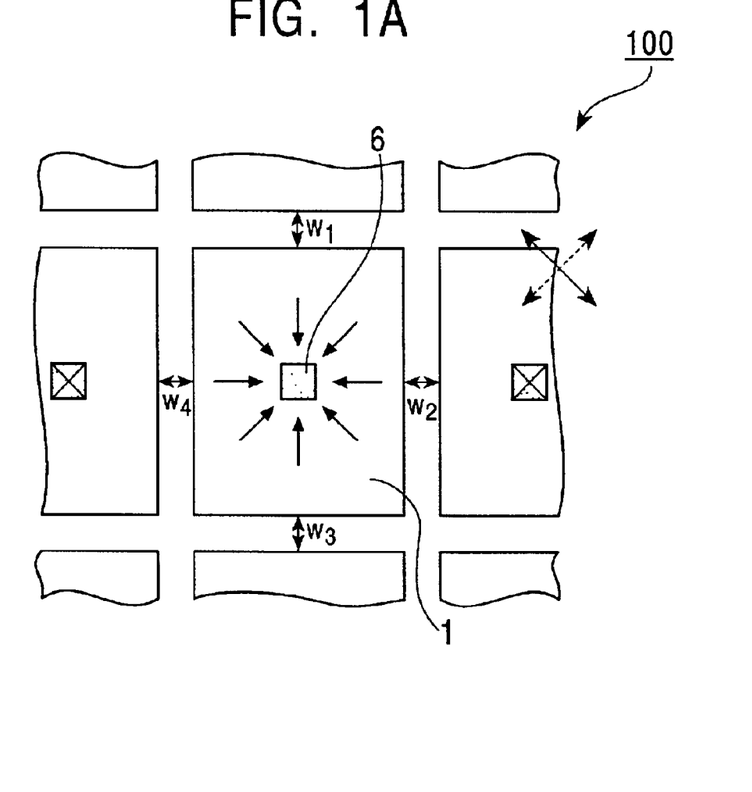
FIGS. 1A and 1B are a plan view and a sectional view, respectively, of a liquid crystal display device according to an embodiment of the present invention.
Figure 1B:
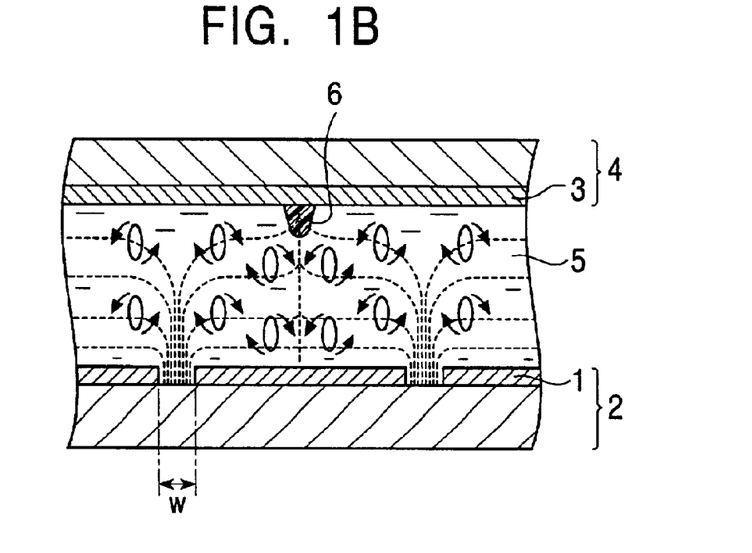

FIG. 1A and 1B are a schematic plan view and a sectional view, respectively, of an active matrix liquid crystal display device 100 according to an embodiment of the present invention.

The liquid crystal display device 100 has, as a driving substrate 2, a TFT substrate with pixel electrodes 1 made of ITO. The driving substrate 2 is placed opposed to a counter substrate 3 having counter electrodes 3 made of ITO. Liquid crystal 5 is sandwiched between the substrates 2 and 4. The upper surfaces of the pixel electrodes 1 and the counter electrodes 3 are coated with a vertical alignment film. Molecules of the liquid crystal 5 are aligned nearly perpendicularly to the driving substrate 2 or the counter substrate 4 when no electric field is applied, are tilted by the application of voltage, and are aligned nearly horizontally by applying a voltage higher than or equal to a predetermined voltage. Polarizers (not shown) are arranged in a crossed-Nicol form on the outer sides of the driving substrate 2 and the counter substrate 4, as shown by the arrows on the upper right side of FIG. 1A.

A protuberance 6 is formed at the center of the counter substrate 4 so as to function as an alignment center portion for orienting the molecules of the liquid crystal 5 in all directions. In order to prevent the aperture ratio from decreasing, the size of the protuberance 6 is determined so that the area of the protuberance 6 in the counter substrate 4, that is, the base area of the protuberance 6, is lower than or equal to 5% of the area of one pixel. In particular, in a case in which the protuberance 6 is formed by proximity exposure, it is preferable that the base area be set within the range of 50 $\mu m^2$. to 225 $\mu^2$. In a case in which the protuberance 6 is formed by step-and-repeat exposure, the base area may be less than or equal to 25 $\mu m^2$.

The height of the protuberance 6 is not particularly limited. In general, spherical spacers are dispersed or resin struts are formed on the substrates in the liquid crystal display in order to maintain the gap therebetween. By setting the height of the protuberance 6 to be equal to the gap between the substrates, the protuberance 6 can also function as a spacer, and this can eliminate the process of dispersing the spacers or forming the struts. It is also possible to avoid the gap defect due to variations in dispersion density of the spacers.

The protuberance 6 controls the alignment so that the molecules of the liquid crystal 5 are tilted when an electric field is not applied, and so that an oblique electric field is produced by distortion of electric lines of force when a voltage is applied, and the molecules are oriented in all directions centered on the protuberance 6, as will be described later. For this reason, in order to effectively control the orientation when a voltage is applied, it is preferable that the protuberance 6 be made of a material having a dielectric constant lower than that of the liquid crystal 5, and more preferably, be made of a material having a dielectric constant less than or equal to the liquid crystal 5. Preferable materials of the protuberance 6 are, for example, acrylic, novolac, and polystyrene photosensitive resins.

While the protuberance 6 shown in FIG. 1 is shaped like a quadrangular prism which is rounded at the top, it may be shaped like any type of cone, an inverted hemisphere, a column, or the like. As will be described later, in order to form an oblique electric field by the protuberance 6 so as to tilt the liquid crystal molecules, it is preferable that the protuberance 6 be triangular or semicircular in cross section taken in a direction perpendicular to the driving substrate 2 or the counter substrate 4. Whichever the protuberance 6 is triangular or semicircular in cross section, similar advantages can be obtained. From the viewpoint of ease of forming, it is more preferable that the protuberance 6 be semicircular. It is undesirable to make the protuberance 6 linear because this lowers the contrast and transmittance.

Figure 2A:
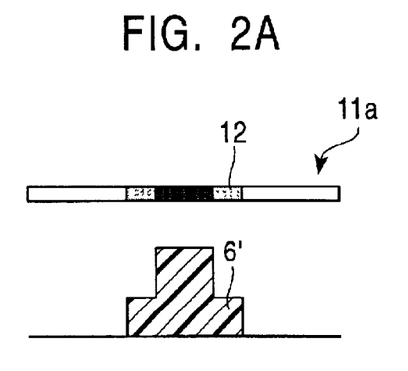
FIGS. 2A and 2B are explanatory views showing a method for forming a semicircular protuberance.
Figure 2B:
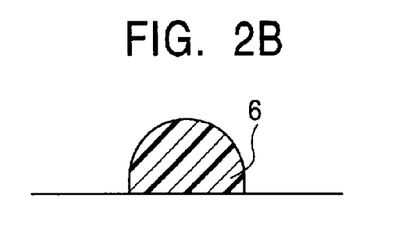
Figure 3A:
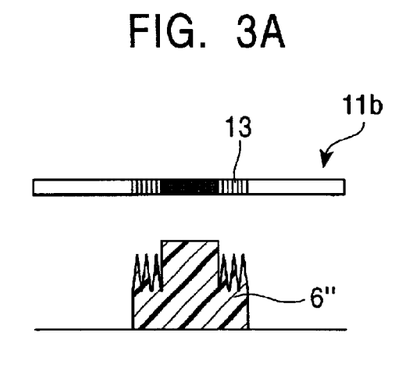
FIGS. 3A and 3B are explanatory views showing a method for forming a semicircular protuberance.
Figure 3B:
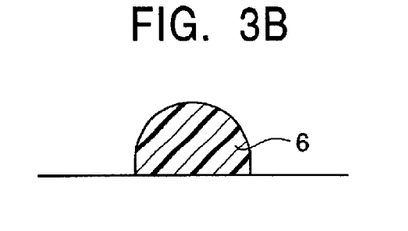

The semicircular protuberance 6 is formed by, for example, applying a positive photosensitive resin on the counter substrate 4, subjecting the resin to exposure, development, and patterning, prebaking the resin at 100° C. to 200° C., at which the resin is not immediately set, and then finally baking the resin. A desired shape can be obtained by adjusting the period and temperature of prebaking. Alternatively, as shown in FIGS. 2A and 2B, a pattern 6' is formed by using a mask 11a having a halftone portion 12 serving as a patterning mask (FIG. 2A), and is baked to form a semicircular protuberance 6 (FIG. 2B). Alternatively, as shown in FIGS. 3A and 3B, a pattern 6" is formed by using a mask 11b having narrow slits 13 serving as a patterning mask (FIG. 3A), and is baked to form a semicircular protuberance 6 (FIG. 3B). The use of such masks 11a and 11b makes it possible to finely control the shape of the protuberance 6.

Operation of the liquid crystal display device 100 shown in FIGS. 1A and 1B will now be described. In the liquid crystal display device 100, the molecules of the liquid crystal 5 are aligned nearly perpendicularly to the driving substrate 2 or the counter substrate 4 when no electric field is applied. When a voltage is applied thereto, spaces w between the adjoining pixel electrodes 1 of the driving substrate 2 function as electrode slits, and a transverse electric field is thereby formed, as shown by dotted equipotential lines in FIG. 1B. The transverse electric field becomes an oblique electric field adjacent to the protuberance 6. For this reason, the liquid crystal molecules radially tilt centered on the protuberance 6 when voltage is applied, as shown by arrows in FIG. 1A, and are oriented in all directions. Accordingly, the liquid crystal display device 100 has improved viewing angle characteristics.

In contrast, in a case in which the protuberance 6 serving as the alignment center portion for alignment is not formed on the counter substrate 4, the liquid crystal molecules tend to be tilted by the transverse electric field formed by the application of the voltage. In this case, however, since the alignment center portion is not provided, the liquid crystal molecules are orientated centered on a point called a disclination. Since the disclination point is unstable and is displaced due to the unevenness of the substrate, the potential of the adjoining pixel, and the like, the orientation cannot be controlled finely. This reduces the display quality of the liquid crystal display device, and the display is nonuniform.

In the present invention, the fact that the molecules are oriented in all directions centered on a certain point does not always mean that the molecules are uniformly distributed in all directions, and the molecules may be oriented only in some directions. For example, in the liquid crystal display device 100 shown in FIG. 1A, the percentage of liquid crystal molecules which point in four directions, that is, the 0, 3, 6, and 9 o'clock directions, is high. However, clear boundaries between the orientation directions exist only adjacent to the protuberance 6 serving as the alignment center portion, and the molecules are continuously oriented around the protuberance 6. In the present invention, such an orientation state is also included in the state in which the molecules are oriented in all directions centered on the protuberance 6.

In the liquid crystal display device 100, light is not transmitted through the spaces w between the adjoining pixel electrodes 1 during a white display state in which a voltage is applied. In general, the spaces w include data lines, gate lines, and the like, and therefore, are not opened. The base area of the protuberance 6 is set to be less than or equal to 5% of the area of each pixel. Therefore, the aperture ratio is not significantly decreased in the liquid crystal display device 100.

The liquid crystal display device of the present invention includes various embodiments other than the embodiment shown in FIGS. 1A and 1B. For example, instead of the protuberance 6, an alignment disturbing surface for disturbing the alignment may be formed on the counter substrate 4 so as to serve as an alignment center portion for orienting the liquid crystal molecules in all directions when a voltage is applied. The alignment disturbing surface may be formed by applying different types of alignment films, for example, by applying a horizontal alignment film only onto the alignment center portion of the counter substrate 4 without applying a vertical alignment film thereon. By exposing the alignment center portion of the counter substrate 4 with UV light, the alignment thereat may be disturbed. Alternatively, a predetermined orientation direction different from that of the peripheral portion may be obtained by applying polarized light to the alignment center portion.

Fine projections and depressions may be formed on an underlayer of the alignment center portion. More specifically, only the surface of the alignment center portion may be roughened with the application of an ion beam by a photoresist process before a vertical alignment film is formed, or an ITO transparent electrode of a different quality may be formed only in the alignment center portion by a photoresist process.

In a case in which the alignment disturbing surface is formed on the counter substrate 4, the area of the alignment disturbing surface is also set to be less than or equal to 5% of the area of each pixel, more preferably, to be 0.1% to 1%, in order not to decrease the aperture ratio.

In general, the pixels of a color liquid crystal display device are divided into three colors, R, G, and B, and each of the R, G, and B pixels is not square, but is rectangular in most cases. In such cases, in order to obtain a more symmetric viewing angle, or to also sufficiently control the alignment in the longitudinal direction of the pixel, the pixel electrode 1 or the counter electrode 3 may be provided with a slit, a cut, or a hole so that the multi-domain alignment of the liquid crystal becomes nearly vertically or horizontally symmetric, and ideally, circular. For example, as shown in FIGS. 4A to 4I, slits 7 and cuts 8 are formed in one pixel of the pixel electrode 1 so as to make the multi-domain alignment of the liquid crystal nearly vertically or horizontally symmetric, and protuberances 6 are formed on the counter electrode 3. In these figures, the slits 7 and the cuts 8 formed in the pixel electrode 1 may be formed in the counter electrode 3, or the protuberances 6 may be replaced with holes. The alignment center portion for the liquid crystal alignment may be formed in the pixel electrode 1. For example, as shown in FIG. 4J, a slit 7 and holes 9 may be formed in the pixel electrode 1.

The slits 7, the cuts 8, or the holes 9 may be formed by, for example, patterning an ITO film by a photoresist process. In particular, in a case in which a slit 7 is formed in the pixel electrode 1, it can be formed without increasing the number of processes because the pixel electrode 1 itself is originally formed by patterning an ITO film.

In the present invention, a chiral material may be added to the liquid crystal 5. The addition of the chiral material can stabilize the alignment when a voltage is applied.

In the liquid crystal display device sandwiched between the polarizers arranged in a crossed-Nicol form, when the liquid crystal molecules are not oriented in a twisted manner, the transmittance greatly depends on the angle which the aligning direction of the liquid crystal molecules forms with the absorption axis or the polarization axis of the polarizers. When the aligning direction of the liquid crystal molecules coincides with the absorption axis or the polarization axis of the polarizers, little light is transmitted, thus causing a black display state. For this reason, in the liquid crystal display device 100 shown in FIGS. 1A and 1B, the liquid crystal molecules oriented in the same direction as that of the absorption axis or the polarization axis of the polarizers, of the molecules oriented horizontally in a white display state in which a voltage is applied, do not transmit light. This lowers the transmittance. The addition of a chiral material is also effective in solving such a problem of decreased transmittance. Since the liquid crystal molecules themselves are oriented in a twisted manner by adding the chiral material, a black display is not produced in a crossed-Nicol arrangement regardless of the alignment direction, and the dependency of the transmittance on the angle between the liquid crystal alignment direction and the absorption axis or the polarization axis of the polarizers can be reduced. Furthermore, by adjusting the chiral pitch so that the liquid crystal molecules are oriented in a twisted manner when a voltage is applied, a high transmittance can be obtained.

In a case in which the liquid crystal molecules are oriented in a twisted manner, the transmittance is highest when the apparent twist angle when a voltage is applied (white display) is approximately 90°. On the other hand, a voltage of 3.5 V to 6 V is usually applied when a white display is produced, and the threshold value of the liquid crystal is approximately 2 V. From the above, in order to maximize the transmittance, it is preferable that the liquid crystal chiral pitch L and the cell gap d have a relationship $2.5<L/d<5.5$. In order to satisfy this condition, it is preferable that the product $\Delta n d$ of the refractive index anisotropy $\Delta n$ with respect to a wavelength of 589 nm and the cell gap d be within the range of 400 nm to 700 nm.

Since the response speed of the liquid crystal display device greatly depends on the cell gap d, it is preferable that the refractive index anisotropy $\Delta n$ be as high as possible in the above condition. More specifically, in order to achieve excellent motion picture display, it is preferable that the refractive index anisotropy $\Delta n$ of the liquid crystal with respect to 589 nm be more than or equal to 0.115.

A color separation filter is provided for each pixel in the color liquid crystal display device. The transmittance of the liquid crystal display device greatly depends on $\Delta n_{eff} \times d/\lambda$, where $\Delta n_{eff}$ represents the apparent refractive index anisotropy of the liquid crystal layer, d represents the cell gap, and $\lambda$ represents the wavelength. This shows that the transmittance greatly depends on the wavelength of light. Even if $\Delta n_{eff} \times d$ is set to be most suitable for a certain wavelength, it is not suitable for another wavelength, and therefore, changes in color balance appear on the display. Such color balance changes appear, in particular, when the display is viewed from an oblique direction. While the wavelength dependency of the transmittance is relatively low in a TN mode, it is high in a vertical-alignment mode adopted in the present invention. This is because the liquid crystal molecules are oriented in all directions when a voltage is applied, and a birefringent mode is mixed even when the liquid crystal molecules are oriented in a twisted manner. In order to improve such a characteristic, it is preferable to set the cell gaps d so as to be suitable for the principal wavelengths λ of each color.

Various methods for changing the cell gap d in accordance with the principal wavelength λ of each color have been proposed. Among them, a method for changing the thickness of a color filter according to the colors is most preferable because this does not increase the number of processes.

Since the liquid crystal display device of the present invention is of a vertical alignment type, a wider viewing angle can be obtained by compensating using a biaxial or uniaxial retardation film. In order to obtain a wide viewing angle in actual use, it is preferable that the retardation film satisfy the following conditions:

$$0.7 < \frac{\Delta n d_{LC}}{\left(\frac{Nx + Ny}{2} - Nz\right) \cdot d_{film}} < 1.3$$

$$(Nx - Ny) \cdot d_{film} < 100 \text{ nm}$$

where Nx and Ny represent the refractive indices of the retardation film in the in-plane directions, Nz represents the refractive index in the thickness direction, $d_{film}$ represents the thickness, Δn represents the refractive index anisotropy of the liquid crystal, and $d_{LC}$ represents the cell gap.

Although not particularly limited, it is preferable that the liquid crystal display device of the present invention be driven by an active matrix addressing method, as shown in FIGS. 1A and 1B. In the active matrix addressing, the spaces between the adjoining pixel electrodes 1 can be positively used as electrode slits for controlling the alignment, and this eliminates the necessity of forming electrode slits on the driving substrate 2 in order to form transverse electric fields. In a case in which an electrode slit is formed in the pixel electrode 1, as necessary, the pattern of the slit can be more freely formed than in the passive matrix addressing using the electrodes arranged in stripes. While the counter electrodes 3 on the counter substrate 4 are formed in stripes in the passive matrix addressing, the counter electrodes 3 on the counter substrate 4 in the active matrix addressing are usually not patterned. Consequently, an oblique electric field for disturbing a predetermined alignment will not be produced.

In an active matrix liquid crystal display device, it is preferable that the pixel pitch be set so that an alignment control force satisfactorily acts. From this point, it is preferable that the pixel pitch be less than or equal to 70 μm.

Figure 5:
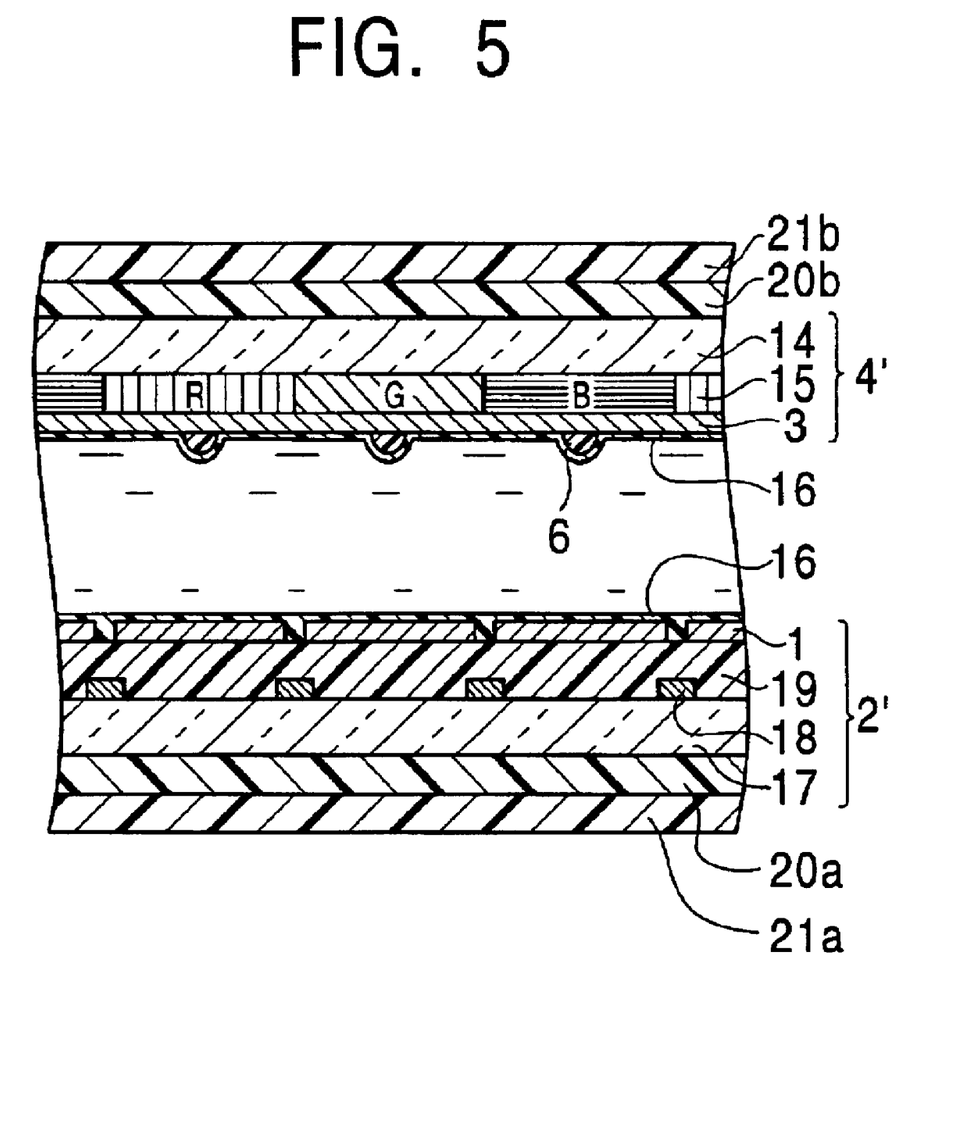
FIG. 5 is a sectional view of a liquid crystal panel.

FIG. 5 is a sectional view showing an embodiment in which the liquid crystal display device of the present invention is applied to a liquid crystal panel of an active matrix type. The liquid crystal panel comprises a TFT substrate 2' serving as a driving substrate, a color filter substrate 4' serving as a counter substrate, and a liquid crystal 5 sandwiched between the substrates.

The color filter substrate 4' includes red (R), green (G), and blue (B) color filters 15 arranged in stripes on a glass substrate 14, and an ITO transparent electrode serving as a counter electrode 3 formed thereon. Protuberances 6 are formed on the surface of the counter electrode 3 on the side of the liquid crystal 5 corresponding to pixel electrodes 1 on the TFT substrate 2', and a vertical alignment film 16 is formed thereon.

In contrast, TFT elements (not shown) and wires, such as signal lines 18, are formed on a glass substrate 17 of the TFT substrate 2', and a planarizing layer 19, the pixel electrodes 1, and a vertical alignment film 16 are sequentially formed thereon.

Retardation films 20a and 20b, and polarizers 21a and 21b arranged in a crossed-Nicol form are formed on the outer sides, a light-incident side (the side of the TFT substrate 2') of the liquid crystal panel and a light-emergent side (the side of the color filter substrate 4'), respectively.

The present invention will be described in detail in the following examples.

FIRST EXAMPLE

The liquid crystal panel shown in FIG. 5 was produced in the following manner.

Rectangular patterns each having a bottom surface with four sides of 7 μm were formed by applying a positive photosensitive resin on a color filter substrate 4', in which red (R), green (G), and blue (B) color filters 15 having a thickness of 1.2 μm were formed in stripes on a glass substrate 14, and an ITO transparent electrode of 100 nm in thickness was formed thereon, and subjecting the photosensitive resin to exposure and development. In order to obtain a more desirable shape, the photosensitive resin was baked at 120° C. to 180° C. for five minutes, and was finally baked above 200° C. Protuberances 6 of semicircular cross section having a height of 1.5 μm were thereby obtained. The dielectric constant of the protuberances 6 was 3. A polyimide vertical alignment film was printed on the surface where the protuberances 6 were formed, and was baked at 180° C. for one hour. A vertical alignment film 16 thus obtained had a thickness of 50 nm to 100 nm. The vertical alignment film 16 was not subjected to rubbing.

On the other hand, a TFT substrate 2' was prepared in which TFT elements and wires, such as signal lines 18, were formed on a glass substrate 17, a planarizing film 19 having a thickness of 3 μm was formed thereon, and ITO electrodes having a thickness of 100 μm were formed thereon as pixel electrodes 1. Each pixel electrode 1 had a length of 120 μm and a width of 40 μm, and spaces w1, w2, w3, and w4 (see FIG. 1A) between the pixel electrode 1 and the adjoining pixel electrodes were set at 7 μm. A vertical alignment film 16 was formed on the pixel electrodes 1 in a manner similar to that in the color filter substrate 4'. Next, a common transfer material was applied, and acrylic spacers (having a particle diameter of 3.5 μm) were dispersed.

Sealing agent was applied onto the above-described color filter substrate 4', the color filter substrate 4' and the TFT substrate 2' were placed one on the other and were baked at 13.3 Pa (0.1 torr) and 120° C. for two hours. Subsequently, a liquid crystal 5 was injected into the panel in a vacuum. The liquid crystal 5 had a Δε of −4, Δn of 0.12, and the chiral pitch of 13 μm.

Retardation films 20a and 20b, and polarizers 21a and 21b arranged in a crossed-Nicol form were sequentially bonded to the outer sides of the TFT substrate 2' and the filter substrate 4', respectively. In this case, the retardation films 20a and 20b had a phase difference only in the thickness direction (Z-axis direction), and satisfy the following condition:

$$(N_X - N_Z)d = 300 \text{ nm}$$

where $N_X$ represents the refractive index in the in-plane direction, Nz represents the refractive index in the thickness direction, and d represents the thickness of the retardation film.

The polarizers 21a and 21b were formed of triacetate films which had a phase difference in the Z-axis direction and provided advantages similar to those of the retardation films 20a and 20b.

The liquid crystal panel thus obtained was inversely driven for one hour. As a result, the liquid crystal panel showed excellent viewing angle characteristics in which no serious contrast decrease and tone reversal appeared in all directions.

SECOND EXAMPLE

Figure 4A:
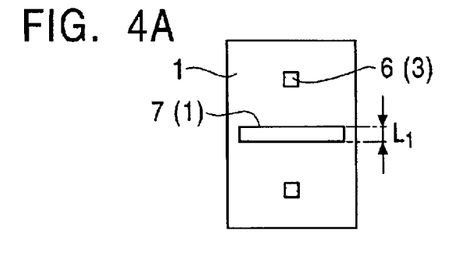
FIGS. 4A to 4J are plan views each showing the positional relationship among a protuberance, a slit, and a cut or a hole.
Figure 4B:
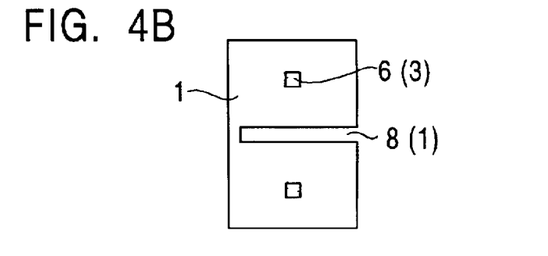

A liquid crystal panel was produced in which the pixel electrodes 1 on the TFT substrate 2' and the protuberances 6 on the color filter substrate 4' in the first example were arranged and patterned, as shown in FIG. 4A. In this case, the width $L_1$ of slits 7 in the color filter substrate 4' was set at 7 μm.

As the result of evaluating the driving of the liquid crystal panel in a manner similar to that in the first example, excellent viewing angle characteristics were obtained in which serious contrast decrease and tone reversal did not appear in all directions. Furthermore, the viewing angle characteristics were more highly symmetric with respect to the azimuth direction than in the first example. Regarding the image quality, the display in a gray raster mode was more uniform than in the first example.

THIRD EXAMPLE

A liquid crystal panel was produced in which the bottom surfaces of the protuberances 6 in the second example were shaped like a square with four sides of 10 μm, and had a height of 4.5 μm, and acrylic spacers were not used.

As the result of evaluating the driving of the obtained liquid crystal panel in a manner similar to that of the first example, viewing angle characteristics similar to those of the second example were obtained. The display was more uniform than in the second example.

FOURTH EXAMPLE

Figure 4C:
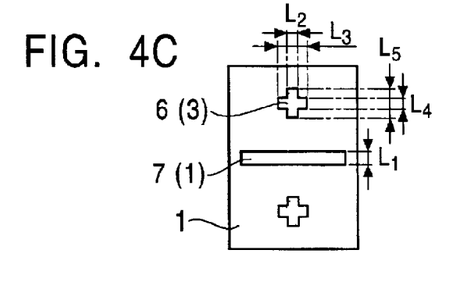
Figure 4D:
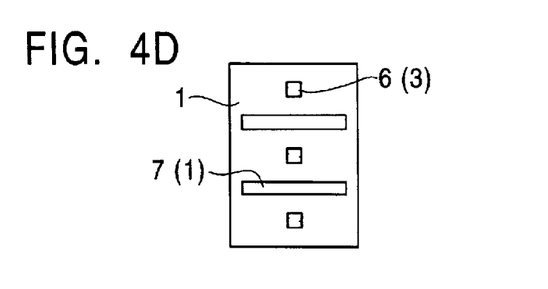
Figure 4E:
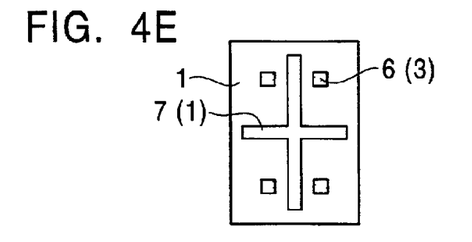
Figure 4F:
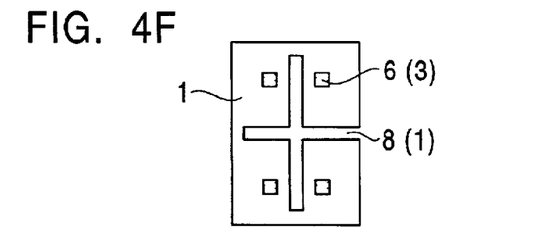
Figure 4G:
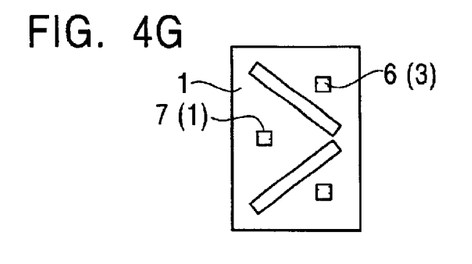
Figure 4H:
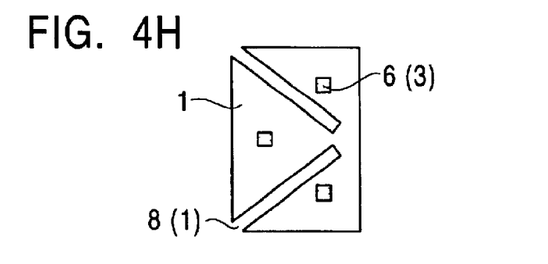
Figure 4I:
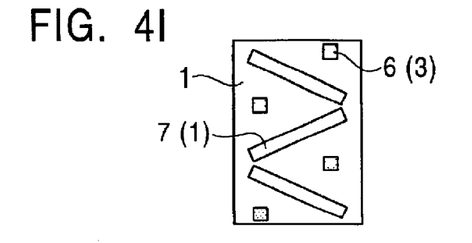
Figure 4J:
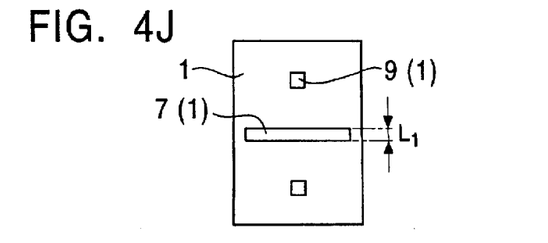

A liquid crystal panel was produced in which the pixel electrodes 1 of the TFT substrate 2' and the protuberances 6 of the color filter substrate 4' were arranged and patterned, as shown in FIG. 4C. In this case, the width $L_1$ of slits 7 on the TFT substrate 2' was set at 7 μm. The bottom surfaces of the protuberances 6 had a size such that $L_2$=5 μm, $L_3$=10 μm, $L_4$=5 μm, and $L_5$=10 μm.

As the result of evaluating the driving of the obtained liquid crystal panel in a manner similar to that of the first example, viewing angle characteristics and image quality similar to those of the second example were obtained.

FIFTH EXAMPLE

A liquid crystal panel was produced in which the protuberances 6 in the second example were replaced with square holes with four sides of 7 μm which are formed in an ITO electrode.

As the result of evaluating the driving of the obtained liquid crystal panel in a manner similar to that of the first example, the image quality was lower than that in the second example, whereas superior viewing angle characteristics were obtained.

SIXTH EXAMPLE

A liquid crystal panel was produced in which the R, G, and B color filters 15 in the second example had thicknesses of 1.0 μm, 1.2 μm, and 1.5 μm, respectively, and the particle diameter of acrylic spacers to be dispersed was set at 4 μm. In this case, the optical densities of the color filters were determined so that the same colors as those in the second example could be obtained with the color filters having the above thicknesses.

In the obtained liquid crystal panel, a brighter white display was produced, and changes in color balance in the azimuth direction were reduced, compared with the second example.

According to the present invention, in the multi-domain vertical-alignment liquid crystal display device, a wide viewing angle can be achieved without decreasing the effective aperture ratio.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A liquid crystal display device of a multi-domain vertical-alignment mode, comprising:

a driving substrate having a pixel electrode;

a counter substrate opposing said driving substrate and having a counter electrode; and a liquid crystal sandwiched between said substrates, wherein molecules of said liquid crystal are aligned nearly perpendicularly to said substrates when no electric field is produced, and are aligned nearly horizontally by the application of a predetermined voltage, wherein said counter substrate has an alignment center portion for orienting said molecules of said liquid crystal in all directions centered on a certain point when the voltage is applied, and wherein said alignment center portion of said counter substrate has a base area than is less than or equal to 5% of the area of one pixel.

2. A liquid crystal display device according to claim 1, wherein said alignment center portion is a protuberance or an alignment disturbing surface.

3. A liquid crystal display device according to claim 2, wherein the base area of said protuberance is within the range of 50 μm² to 225 μm².

4. A liquid crystal display device according to claim 3, wherein a retardation film is placed between said driving substrate or said counter substrate, and a polarizer on the outside of said driving substrate or said counter substrate, and the following conditions are satisfied:

$$0.7 < \frac{\Delta n d_{LC}}{\left(\frac{Nx+Ny}{2} - Nz\right) \cdot d_{film}} < 1.3$$

$$(Nx - Ny) \cdot d_{film} < 100 \text{ nm}$$

where Nx and Ny represent the refractive indices of said retardation film in the in-plane directions, Nz represents the refractive index of said retardation film in the thickness direction, $d_{film}$ represents the thickness of said retardation film, Δn represents the refractive index anisotropy of said liquid crystal, and $d_{LC}$ represents the cell gap.

5. A liquid crystal display device according to claim 2, wherein the base area of said alignment disturbing surface is less than or equal to 225 $\mu m^2$.

6. A liquid crystal display device according to claim 5, wherein a retardation film is placed between said driving substrate or said counter substrate, and a polarizer on the outside of said driving substrate or said counter substrate, and the following conditions are satisfied:

$$0.7 < \frac{\Delta n d_{LC}}{\left(\frac{Nx+Ny}{2} - Nz\right) \cdot d_{film}} < 1.3$$

$$(Nx - Ny) \cdot d_{film} < 100 \text{ nm}$$

where Nx and Ny represent the refractive indices of said retardation film in the in-plane directions, Nz represents the refractive index of said retardation film in the thickness direction, $d_{film}$ represents the thickness of said retardation film, $\Delta n$ represents the refractive index anisotropy of said liquid crystal, and $d_{LC}$ represents the cell gap.

7. A liquid crystal display device according to claim 2, wherein a retardation film is placed between said driving substrate or said counter substrate, and a polarizer on the outside of said driving substrate or said counter substrate, and the following conditions are satisfied:

$$0.7 < \frac{\Delta n d_{LC}}{\left(\frac{Nx+Ny}{2} - Nz\right) \cdot d_{film}} < 1.3$$

$$(Nx - Ny) \cdot d_{film} < 100 \text{ nm}$$

where Nx and Ny represent the refractive indices of said retardation film in the in-plane directions, Nz represents the refractive index of said retardation film in the thickness direction, $d_{film}$ represents the thickness of said retardation film, $\Delta n$ represents the refractive index anisotropy of said liquid crystal, and $d_{LC}$ represents the cell gap.

8. A liquid crystal display device according to claim 1, wherein said pixel electrode or said counter electrode has a slit, a cut, or a hole for making multi-domain alignment of said liquid crystal nearly vertically or horizontally symmetric.

9. A liquid crystal display device according to claim 8, wherein a retardation film is placed between said driving substrate or said counter substrate, and a polarizer on the outside of said driving substrate or said counter substrate, and the following conditions are satisfied:

$$0.7 < \frac{\Delta n d_{LC}}{\left(\frac{Nx+Ny}{2} - Nz\right) \cdot d_{film}} < 1.3$$

$$(Nx - Ny) \cdot d_{film} < 100 \text{ nm}$$

where Nx and Ny represent the refractive indices of said retardation film in the in-plane directions, Nz represents the refractive index of said retardation film in the thickness direction, $d_{film}$ represents the thickness of said retardation film, $\Delta n$ represents the refractive index anisotropy of said liquid crystal, and $d_{LC}$ represents the cell gap.

10. A liquid crystal display device according to claim 1, wherein a chiral material is added to said liquid crystal.

11. A liquid crystal display device according to claim 10, wherein said liquid crystal has a chiral pitch L and a cell gap d such than 2.521 L/d<5.5.

12. A liquid crystal display device according to claim 11, wherein a retardation film is placed between said driving substrate or said counter substrate, and a polarizer on the outside of said driving substrate or said counter substrate, and the following conditions are satisfied:

$$0.7 < \frac{\Delta n d_{LC}}{\left(\frac{Nx+Ny}{2} - Nz\right) \cdot d_{film}} < 1.3$$

$$(Nx - Ny) \cdot d_{film} < 100 \text{ nm}$$

where Nx and Ny represent the refractive indices of said retardation film in the in-plane directions, Nz represents the refractive index of said retardation film in the thickness direction, 13. A liquid crystal display device according to claim 10, wherein a retardation film is placed between said driving substrate or said counter substrate, and a polarizer on the outside of said driving substrate or said counter substrate, and the following conditions are satisfied:

$$0.7 < \frac{\Delta n d_{LC}}{\left(\frac{Nx+Ny}{2} - Nz\right) \cdot d_{film}} < 1.3$$

$$(Nx - Ny) \cdot d_{film} < 100 \text{ nm}$$

where Nx and Ny represent the refractive indices of said retardation film in the in-plane directions, Nz represents the refractive index of said retardation film in the thickness direction, $d_{film}$ represents the thickness of said retardation film, $\Delta n$ represents the refractive index anisotropy of said liquid crystal, and $d_{LC}$ represents the cell gap.

14. A liquid crystal display device according to claim 1, wherein said liquid crystal display device is of an active matrix type.

15. A liquid crystal display device according to claim 14, wherein a pixel pitch is less than or equal to 70 $\mu$m.

16. A liquid crystal display device according to claim 15, wherein a retardation film is placed between said driving substrate or said counter substrate, and a polarizer on the outside of said driving substrate or said counter substrate, and the following conditions are satisfied:

$$0.7 < \frac{\Delta n d_{LC}}{\left(\frac{Nx+Ny}{2} - Nz\right) \cdot d_{film}} < 1.3$$

$$(Nx - Ny) \cdot d_{film} < 100 \text{ nm}$$

where Nx and Ny represent the refractive indices of said retardation film in the in-plane directions, Nz represents the refractive index of said retardation film in the thickness direction, $d_{film}$ represents the thickness of said retardation film, $\Delta n$ represents the refractive index anisotropy of said liquid crystal, and $d_{LC}$ represents the cell gap.

17. A liquid crystal display device according to claim 14, wherein a retardation film is placed between said driving substrate or said counter substrate, and a polarizer on the outside of said driving substrate or said counter substrate, and the following conditions are satisfied:

$$0.7 < \frac{\Delta n d_{LC}}{\left(\frac{Nx+Ny}{2} - Nz\right) \cdot d_{film}} < 1.3$$

$$(Nx - Ny) \cdot d_{film} < 100 \text{ nm}$$

where Nx and Ny represent the refractive indices of said retardation film in the in-plane directions, Nz represents the refractive index in the thickness direction, $d_{film}$ represents the thickness, $\Delta n$ represents the refractive index anisotropy of said liquid crystal, and $d_{LC}$ represents the cell gap.

18. A liquid crystal display device according to claim 1, wherein a retardation film is placed between said driving substrate or said counter substrate, and a polarizer on the outside of said driving substrate or said counter substrate, and the following conditions are satisfied:

$$0.7 < \frac{\Delta nd_{LC}}{\left(\frac{Nx+Ny}{2}-Nz\right) \cdot d_{film}} < 1.3$$

$$(Nx-Ny) \cdot d_{film} < 100 \text{ nm}$$

where Nx and Ny represent the refractive indices of said retardation film in the in-plane directions, Nz represents the refractive index of said retardation film in the thickness direction, $d_{film}$ represents the thickness of said retardation film, Δn represents the refractive index anisotropy of said liquid crystal, and $d_{LC}$ represents the cell gap.

19. A production method for a liquid crystal display device of a multi-domain vertical-alignment mode in which a driving substrate having a pixel electrode and a counter substrate having a counter electrode are opposed to each other, a liquid crystal is sandwiched between said substrates, and molecules of said liquid crystal are aligned nearly perpendicularly to said substrates when no electric field is produced, and are aligned nearly horizontally by the application of a predetermined voltage, wherein said counter substrate has an alignment center portion for orienting said molecules of said liquid crystal in all directions centered on a certain point when the voltage is applied, and wherein the area of said alignment center portion of said counter substrate is set to be less than or equal to 5% of the area of one pixel.

20. A production method for a liquid crystal display device according to claim 19, wherein a protuberance is formed as said alignment center portion by applying a photosensitive resin onto said counter substrate, and patterning said photosensitive resin.

21. A production method for a liquid crystal display device according to claim 20, wherein the base area of said protuberance is within the range of 50 μm² to 225 μm².

22. A production method for a liquid crystal display device according to claim 21, wherein a retardation film for is placed between said driving substrate or said counter substrate, and a polarizer on the outside of said driving substrate or said counter substrate, and the following conditions are satisfied:

$$0.7 < \frac{\Delta nd_{LC}}{\left(\frac{Nx+Ny}{2}-Nz\right) \cdot d_{film}} < 1.3$$

$$(Nx-Ny) \cdot d_{film} < 100 \text{ nm}$$

where Nx and Ny represent the refractive indices of said retardation film in the in-plane directions, Nz represents the refractive index of said retardation film in the thickness direction, $d_{film}$ represents the thickness of said retardation film, Δn represents the refractive index anisotropy of said liquid crystal, and $d_{LC}$ represents the cell gap.

23. A production method for a liquid crystal display device according to claim 20, wherein a retardation film is placed between said driving substrate or said counter substrate, and a polarizer on the outside of said driving substrate or said counter substrate, and the following conditions are satisfied:

$$0.7 < \frac{\Delta nd_{LC}}{\left(\frac{Nx+Ny}{2}-Nz\right) \cdot d_{film}} < 1.3$$

$$(Nx-Ny) \cdot d_{film} < 100 \text{ nm}$$

where Nx and Ny represent the refractive indices of said retardation film in the in-plane directions, Nz represents the refractive index of said retardation film in the thickness direction, $d_{film}$ represents the thickness of said retardation film, Δn represents the refractive index anisotropy of said liquid crystal, and $d_{LC}$ represents the cell gap.

24. A production method for a liquid crystal display device according to claim 19, wherein an alignment disturbing surface is formed as said alignment center portion by applying different types of alignment films, or by applying UV light, polarized light, or an ion beam.

25. A production method for a liquid crystal display device according to claim 24, wherein a retardation is placed between said driving substrate or said counter substrate, and a polarizer on the outside of said driving substrate or said counter substrate, and the following conditions are satisfied:

$$0.7 < \frac{\Delta nd_{LC}}{\left(\frac{Nx+Ny}{2}-Nz\right) \cdot d_{film}} < 1.3$$

$$(Nx-Ny) \cdot d_{film} < 100 \text{ nm}$$

where Nx and Ny represent the refractive indices of said retardation film in the in-plane directions, Nz represents the refractive index of said retardation film in the thickness direction, $d_{film}$ represents the thickness of said retardation film, (n represents the refractive index anisotropy of said liquid crystal, and $d_{LC}$ represents the cell gap.

26. A production method for a liquid crystal display device according to claim 19, wherein said driving substrate or said counter substrate is provided with a slit, a cut, or a hole for making multi-domain alignment of said liquid crystal nearly vertically or horizontally symmetric.

27. A production method for a liquid crystal display device according to claim 26, wherein a retardation film is placed between said driving substrate or said counter substrate, and a polarizer on the outside of said driving substrate or said counter substrate, and the following conditions are satisfied:

$$0.7 < \frac{\Delta nd_{LC}}{\left(\frac{Nx+Ny}{2}-Nz\right) \cdot d_{film}} < 1.3$$

$$(Nx-Ny) \cdot d_{film} < 100 \text{ nm}$$

where Nx and Ny represent the refractive indices of said retardation film in the in-plane directions, Nz represents the refractive index of said retardation film in the thickness direction, $d_{film}$ represents the thickness of said retardation film, Δn represents the refractive index anisotropy of said liquid crystal, and $d_{LC}$ represents the cell gap.

28. A production method for a liquid crystal display device according to claim 19, wherein a chiral material is added to said liquid crystal.

29. A production method for a liquid crystal display device according to claim 28, wherein said crystal has a chiral pitch L and the cell gap d such that 2.5 <L/d<5.5.

30. A production method for a liquid crystal display device according to claim 29, wherein a retardation film is placed between said driving substrate or said counter substrate, and a polarizer on the outside of said driving substrate or said counter substrate, and the following conditions are satisfied:

$$0.7 < \frac{\Delta n d_{LC}}{\left(\frac{Nx+Ny}{2}-Nz\right) \cdot d_{film}} < 1.3$$

$$(Nx-Ny) \cdot d_{film} < 100 \text{ nm}$$

where Nx and Ny represent the refractive indices of said retardation film in the in-plane directions, Nz represents the refractive index of said retardation film in the thickness direction, $d_{film}$ represents the thickness of said retardation film, Δn represents the refractive index anisotropy of said liquid crystal, and $d_{LC}$ represents the cell gap.

31. A production method for a liquid crystal display device according to claim 28, wherein a retardation film is placed between said driving substrate or said counter substrate, and a polarizer on the outside of said driving substrate or said counter substrate, and the following conditions are satisfied:

$$0.7 < \frac{\Delta n d_{LC}}{\left(\frac{Nx+Ny}{2}-Nz\right) \cdot d_{film}} < 1.3$$

$$(Nx-Ny) \cdot d_{film} < 100 \text{ nm}$$

where Nx and Ny represent the refractive indices of said retardation film in the in-plane directions, Nz represents the refractive index of said retardation film in the thickness direction, $d_{film}$ represents the thickness of said retardation film, (n represents the refractive index anisotropy of said liquid crystal, and $d_{LC}$ represents the cell gap.

32. A production method for a liquid crystal display device according to claim 19, wherein a TFT substrate is used as said driving substrate.

33. A production method for a liquid crystal display device according to claim 32, wherein a pixel pitch is less than or equal to 70 μm.

34. A production method for a liquid crystal display device according to claim 33, wherein a retardation film is placed between said driving substrate or said counter substrate, and a polarizer on the outside of said driving substrate or said counter substrate, and the following conditions are satisfied:

$$0.7 < \frac{\Delta n d_{LC}}{\left(\frac{Nx+Ny}{2}-Nz\right) \cdot d_{film}} < 1.3$$

$$(Nx-Ny) \cdot d_{film} < 100 \text{ nm}$$

where Nx and Ny represent the refractive indices of said retardation film in the in-plane directions, Nz represents the refractive index of said retardation film in the thickness direction, $d_{film}$ represents the thickness of said retardation film, Δn represents the refractive index anisotropy of said liquid crystal, and $d_{LC}$ represents the cell gap.

35. A production method for a liquid crystal display device according to claim 32, wherein a retardation film is placed between said driving substrate or said counter substrate, and a polarizer on the outside of said driving substrate or said counter substrate, and the following conditions are satisfied:

$$0.7 < \frac{\Delta n d_{LC}}{\left(\frac{Nx+Ny}{2}-Nz\right) \cdot d_{film}} < 1.3$$

$$(Nx-Ny) \cdot d_{film} < 100 \text{ nm}$$

where Nx and Ny represent the refractive indices of said retardation film in the in-plane directions, Nz represents the refractive index of said retardation film in the thickness direction, $d_{film}$ represents the thickness of said retardation film, Δn represents the refractive index anisotropy of said liquid crystal, and $d_{LC}$ represents the cell gap.

36. A production method for a liquid crystal display device according to claim 19, wherein a retardation film is placed between said driving substrate or said counter substrate, and a polarizer on the outside of said driving substrate or said counter substrate, and the following conditions are satisfied:

$$0.7 < \frac{\Delta n d_{LC}}{\left(\frac{Nx+Ny}{2}-Nz\right) \cdot d_{film}} < 1.3$$

$$(Nx-Ny) \cdot d_{film} < 100 \text{ nm}$$

where Nx and Ny represent the refractive indices of said retardation film in the in-plane directions, Nz represents the refractive index of said retardation film in the thickness direction, $d_{film}$ represents the thickness of said retardation film, Δn represents the refractive index anisotropy of said liquid crystal, and $d_{LC}$ represents the cell gap.

* * * * *

UNITED STATES PATENT AND TRADEMARK OFFICE
CERTIFICATE OF CORRECTION

PATENT NO. : 6,801,286 B2
DATED : October 5, 2004
INVENTOR(S) : Hidemasa Yamaguichi et al.

It is certified that error appears in the above-identified patent and that said Letters Patent is hereby corrected as shown below:

Title page,
Item [54], Title, change "LIQUID CRYSTAL DISPLAY DEVICE HAVING PROTUBERANCE WITH BASE AREA ≤5% OF ONE PIXEL TO CONTROL LIQUID CRYSTAL MOLECULE ORIENTATION," should read -- LIQUID CRYSTAL DISPLAY DEVICE HAVING PROTUBERANCE TO CONTROL LIQUID CRYSTAL MOLECULE ORIENTATION --.
Item [75], Inventors, "Hiroaki Ichiawa," should read -- Hiroaki Ichikawa --.

Signed and Sealed this

Eighth Day of March, 2005

JON W. DUDAS
*Director of the United States Patent and Trademark Office*